United States Patent Office 2,891,979
Patented June 23, 1959

2,891,979
ARYL SULFIMIDES

Harry E. Ford, Euclid, and Wilbur J. Shenk, Jr., Shaker Heights, Ohio, assignors to The Harshaw Chemical Company, Cleveland, Ohio, a corporation of Ohio No Drawing. Application July 1, 1957
Serial No. 668,929

2 Claims. (Cl. 260—439)

This invention relates to long-chain aryl sulfimides containing two disulfimide groups, substitution products thereof and salts of the foregoing.

This application is a continuation-in-part of our copending application Serial No. 615,012, filed October 10, 1956, now Patent No. 2,848,392.

In accordance with the present invention, we provide novel compounds which we may utilize in the nickel plating process, such additives being of the following general formula:

$C_6H_5SO_2NHSO_2C_6H_4O[CH_2CH_2O]_nC_6H_4SO_2NHSO_2C_6H_5$ wherein $n$ is an integer from 1 to 2. Our invention contemplates the salts of the compounds of the above general formula and derivatives thereof wherein from 1 to 4 nuclear hydrogens are replaced by radicals of the class consisting of chlorine, bromine, fluorine, methyl, ethyl, carboxyl, and sulfamyl.

So far as we are aware, these compounds are new compounds never before synthesized or used for any purpose and while we are chiefly interested in their usage as additives in nickel electrodeposition, we believe that they are undoubtedly useful for other purposes.

These compounds may be synthesized by reacting together aryl sulfonamides with compounds of the general formula $ClSO_2C_6H_4O[CH_2CH_2O]_nC_6H_4SO_2Cl$ wherein $n$ is an integer from 1 to 2.

A specific example of a compound according to the invention was synthesized as follows:

A quantity of 0.05 mol (20.5 grams) of 1,2-diphenoxyethane-p,p'-disulfonyl chloride was added to 0.2 mol (31.4 grams) of benzene sulfonamide dissolved in 0.2 mol (8.34 grams, 96% strength) of NaOH in 150 cc. of water. The sulfonyl chloride was added to the sulfonamide solution over a period of one-half hour at from 50 to 55° C. The reaction mixture was stirred for one-half hour at this temperature and then heated to reflux for 1 hour. The mixture was allowed to stand overnight and diluted to 600 cc. The pH was adjusted to 2.5 with dilute hydrochloric acid. The excess benzene sulfonamide was filtered off at 20° C. It amounted to 3 grams. The filtrate, a clear straw-colored solution was acidified with hydrochloric acid by the addition of enough to make the solution 5% HCl, this addition being made at 50–60° C.

A fine white crystalline precipitate was formed. This was filtered off at 35° C. and dried. The yield was 25 grams which is a 76.8% yield. The melting point of the product was 229–234° C. In order to further purify the product it was dissolved in one liter of water and brought to a boil. The pH was adjusted to 7.0 with sodium carbonate whereupon all the material went into solution. The solution was carbon treated with activated carbon and filtered. The filtrate was acidified with sufficient acid to make the solution 5% HCl, this addition being made at 50–60° C. dropwise. A fine white crystalline precipitate was formed and separated by filtration at 35° C. This precipitate was dried at 40–50° C. and yielded 17 grams of products, a yield of 52.2% of theoretical. The melting point was 233–238° C., the formula being

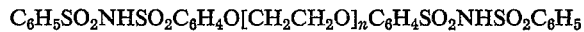

Other examples of compounds according to the invention may be produced in the same way, for example, the compounds appearing in Table I.

Table I

1. $[C_6H_5SO_2NHSO_2C_6H_4OCH_2]_2$
2. $[ClCH_4SO_2NHSO_2C_6H_4OCH_2]_2$
3. $[ClC_6H_4SO_2NHSO_2C_6H_4OCH_2CH_2]_2O$
4. $[BrC_6H_4SO_2NHSO_2C_6H_4OCH_2]_2$
5. $[CH_3C_6H_4SO_2NHSO_2C_6H_4OCH_2]_2$
6. $[C_2H_5C_6H_4SO_2NHSO_2C_6H_4OCH_2]_2$
7. $[HOOCC_6H_4SO_2NHSO_2C_6H_4OCH_2]_2$
8. $[NH_2SO_2OC_6H_4SO_2NHSO_2C_6H_4OCH_2]_2$

The foregoing are but a few examples of the numerous similar compounds within scope of the above stated general formula and which may be made in the same way as the example shown above by selection of suitable starting materials, all of which will be obvious from the foregoing to persons skilled in the art. Preferred compounds are of the formula

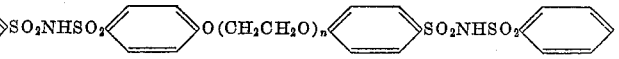

where $n$ is an integer from 1 to 2 or salts thereof or derivatives of said compounds or said salts wherein from 1 to 4 nuclear hydrogens are replaced by radicals of the class consisting of chlorine, bromine, fluorine, methyl, ethyl, carboxyl and sulfamyl. Compounds so prepared within the above indicated class of compounds are suitable as additives for use in electrodeposition of nickel of improved lustre when used either as the sole brightening additive or with auxiliary brightening additives capable of enhancing the brilliance of the deposit. When such compounds are used as the sole brightening additives, the solutions under all normal circumstances are capable of producing deposits of improved lustre and in some instances are capable of producing better than semi-bright deposits and even deposits of image reflecting brightness under favorable conditions. Still brighter deposits can be produced by the addition of auxiliary brighteners.

It will be understood that the substitution products shown in Table I may be made by a procedure exactly as described in the example except that instead of using benzene sulfonamide, a substituted benzene sulfonamide would be used. The proportions of such substituted benzene sulfonamide preferably would be molecularly equivalent to the quantity of benzene sulfonamide used in the above example. The salts may be produced by reaction with, for example, the hydroxide of the metal whose salt is desired. Sodium, potassium, nickel, iron and cobalt salts are examples of salts contemplated by the invention. Other soluble metal salts can be produced similarly.

Having thus described the invention, what is claimed is:

1. As new compositions of matter compounds of the general formula

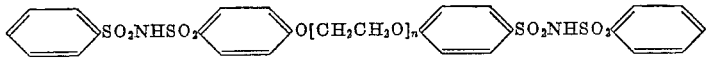

wherein $n$ is an integer from 1 to 2 inclusive, and the sodium, potassium, iron, cobalt and nickel salts thereof and derivatives of the foregoing wherein from 1 to 4 nuclear hydrogen atoms are replaced by radicals of the class consisting of chlorine, bromine, fluorine, methyl, ethyl, carboxyl and sulfamyl.

2. As a new composition of matter, a compound of the formula

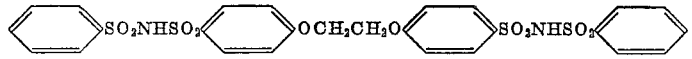

and the sodium, potassium, iron, cobalt and nickel salts thereof and derivatives of the foregoing wherein from 1 to 4 nuclear hydrogen atoms are replaced by radicals of the class consisting of chlorine, bromine, fluorine, methyl, ethyl, carboxyl and sulfamyl.

References Cited in the file of this patent

UNITED STATES PATENTS 2,309,870    Salomon _____ Feb. 2, 1943

OTHER REFERENCES

Richter: Textbook of Organic Chemistry, 1952, pages 256 and 257.